United States Patent [19]

Gogarty et al.

[11] 4,008,924
[45] Feb. 22, 1977

[54] PROCESS FOR REDUCING THE SETTLING RATE OF COMMINUTED POROUS SOLIDS IN A WATER-SOLIDS SLURRY

[75] Inventors: William B. Gogarty, Littleton; LaVaun S. Merrill, Jr., Englewood, both of Colo.

[73] Assignee: Marathon Oil Company, Findlay, Ohio

[22] Filed: Apr. 18, 1975

[21] Appl. No.: 569,515

[52] U.S. Cl. .................................. 302/66; 44/1 R; 44/6; 302/14
[51] Int. Cl.² ......................................... B65G 53/30
[58] Field of Search ............................. 302/14–16, 302/66; 44/6, 51, 1 R; 110/75; 137/1, 13

[56] References Cited
UNITED STATES PATENTS

| 1,508,617 | 9/1924 | Schoch | 44/1 R |
| 1,574,174 | 2/1926 | Schoch | 44/1 R |
| 1,598,086 | 8/1926 | Kitchen | 44/6 |
| 2,791,471 | 5/1957 | Clancey | 302/66 |
| 3,206,256 | 9/1965 | Scott | 302/66 |
| 3,302,977 | 2/1967 | Shock et al. | 302/14 |
| 3,359,040 | 12/1967 | Every et al. | 302/14 |
| 3,456,987 | 7/1969 | Hughes et al. | 302/66 |

*Primary Examiner*—Evon C. Blunk
*Assistant Examiner*—Jeffrey V. Nase
*Attorney, Agent, or Firm*—Joseph C. Herring; Jack L. Hummel

[57] ABSTRACT

Comminuted solids having a specific gravity greater than 1.0 and having a porosity greater than about 10% are maintained in suspension within a liquid-solids slurry by saturating the pores of the solids with a substance having a specific gravity lower than 1.0.

17 Claims, No Drawings

PROCESS FOR REDUCING THE SETTLING RATE OF COMMINUTED POROUS SOLIDS IN A WATER-SOLIDS SLURRY

BACKGROUND OF THE INVENTION

1 Field of the Invention

This invention relates to a process of transporting, e.g., in a conduit, a water slurry containing comminuted solids.

2. Description of the Prior Art

The transportation of solid particles through pipelines has become an economically attractive method of moving bulk solids over long distances. This method has proven effective for transporting coal, sulfur, wax and other solids capable of being converted into particulate form. The solid material is generally comminuted by pulverization, shearing or other means of degradation, suspended in a liquid carrier medium, and then injected under pressure into a conduit, e.g., a pipeline. If the density of the comminuted matter is significantly greater than the supporting liquid carrier, the particles tend to settle to the bottom of the pipeline, especially where obstructions interfere with the flow of the slurry or in low spots in the line. This problem is particularly pronounced during shut-down of flow through the pipeline or when the comminuted matter is subject to agglomeration. Settling of the solid particles can result in plugging, pump blockages and substantial pressure gradients within the pipeline. It is possible to approximate a homogeneous liquid-solid slurry by maintaining the slurry flow under turbulent flow conditions (e.g., at a Reynolds number greater than about 4,000)—but high pumping costs necessarily result.

U.S. Pat. No. 3,432,209 to Scott teaches reducing the settling rate of inorganic salts in a petroleum-inorganic salt slurry by adding to the slurry an anionic sulfonate dispersant. The dispersant attaches to the salt granules, thereby lowering the density of the complex.

U.S. Pat. No. 3,264,038 to Shock et al. teaches protecting a solid from a carrier liquid by coating the solid with a material which is insoluble in and unreactive with the carrier liquid.

U.S. Pat. No. 3,359,040 to Every et al. teaches adsorbing water onto the surface of a solid pulverant material and then mixing the solid with a hydrocarbon carrier.

U.S. Pat. No. 3,637,263 to Wasp teaches transporting a water-coal slurry by incorporating in the slurry an inorganic finely divided water insoluble solid carrier having a specific gravity greater than 1.6.

U.S. Pat. No. 3,389,714 to Hughes teaches increasing the pumpability of viscous liquids and liquid-solid slurries by adding a fluid to the liquid, and maintaining the liquid under sufficient temperature and pressure to keep the fluid in a gaseous state. The gaseous fluid is adsorbed in the liquid thereby reducing its viscosity.

Other prior art references have proposed methods for reducing the tendency of some types of particles to form agglomerations within liquid-solid slurry systems. For example, U.S. Pat. No. 3,269,401 to Scott et al. teaches facilitating the flow of wax-bearing oil through pipelines by dissolving in the oil at superatmospheric pressure and above the oil's pour point, a gas which can be nitrogen, carbon dioxide, flue gas, hydrocarbons having less than three carbon atoms and mixtures thereof. Upon shut-down of the pipeline flow, the pressure is lowered in the pipeline to below the bubble point, thereby causing gas to separate from the oil as small bubbles. These bubbles become associated with the existing and newly formed wax crystals, and prevent the formation of a strong wax structure.

U.S. Pat. No. 3,292,647 to Scott teaches subjecting a wax-containing oil, at a temperature below the pour point of the wax, to shearing forces sufficient to break down the wax structure into a fine dispersion, and injecting a gas into the oil to prevent regrowth of the wax crystals.

None of the prior art references, however, teach a means of lowering the effective density of porous solids in a liquid-solids slurry.

SUMMARY OF THE INVENTION

Solids, having a specific gravity greater than 1.0 and having a porosity greater than about 10%, are maintained in suspension within a liquid-solids slurry by comminuting the solids to an average diameter less than about 2,000 microns, saturating the pores of the comminuted solids with a liquid material having a specific gravity less than about 1.0, e.g., a simple liquid hydrocarbon, and then slurrying the comminuted solids in the liquid, preferably water, for subsequent transportation. The low density liquid material should not be miscible with the carrier liquid and remains associated with the solid particles, thereby lowering the effective density of the particles with respect to the carrier liquid.

PREFERRED EMBODIMENTS OF THE INVENTION

Solids useful with the present invention can be any solids which have a specific gravity greater than about 1.0, have an average porosity greater than about 10% and are unreactive with and insoluble in the carrier liquid. Examples of preferred solids include high porosity coal, heated or calcined coal, partially devolatilized coal, volatilized coal, coal char, coke, retorted oil shale, porous rock mixtures thereof—coal is defined to include the different classifications of coal such as lignite, bituminous and anthracite. Particularly preferred solids are coal and coke. The solids should have a specific gravity greater than about 1.0, more preferably greater than about 1.2 and more preferably greater than about 1.4. The solids should have a porosity of about 10 to about 80%, more preferably about 20 to about 70% and most preferably about 30 to about 60% by volume of the solid material in order to retain sufficient amounts of a low density material to substantially lower the effective density of the comminuted solids when slurried in the carrier liquid. The solid material is pulverized, sheared or otherwise degraded to an average particle size of about 0.1 to about 2,000 microns, more preferably about 25 to about 1,000 microns, and most preferably about 75 to about 500 microns. The process is applicable to any particle sizes that may be transported with liquid as a slurry, although substantial amounts of particles larger than about 2,000 microns can result in plugging, blockages, etc., of the conduit by the resulting slurry. It is preferred that 95% of the comminuted solids pass through a 14 mesh Tyler Series screen.

The pores of the comminuted solids are then substantially saturated, i.e., preferably at least about 75%, with a fluid material having a specific gravity less than about 1.0, more preferably less than about 0.9, and most preferably less than about 0.8, and which will be retained within the pores of the solid upon subsequent slurrying with the carrier liquid. The fluid material is preferably immiscible in the carrier liquid and more preferably has good retention characteristics in the pores of the solid—most preferably it will wet the pores of the solids. Preferred fluids include liquid hydrocarbons and substituted derivatives thereof, e.g. hydrocarbons containing less than 5 carbon atoms in the molecule—with the latter, increased pressure levels may be required to maintain the hydrocarbons in a liquid state within the pores of the particles. Examples of particularly preferred hydrocarbons include pentane, hexane, benzene, etc. Other useful hydrocarbons include crude oil, partially refined fractions of crude oil and refined fractions of crude oil. The fluid material should not be present at concentrations and/or conditions within the pipeline such that cavitation of the pumping means on the pipeline system will occur to substantially adversely affect the pumpability of the slurry.

In practice, saturation of the pores of the comminuted solids with the low density fluid material may be achieved by boiling the comminuted solid particles in the material, e.g., liquid, for about 5 minutes, by creating a vacuum in the pores prior to contacting the comminuted solid with the fluid, e.g., by dumping hot particles in cold hydrocarbon or by contacting the fluid material with the solids under a vacuum, by treating the pores of the solid particles to enhance adsorption and/or retention of the fluid material, or by other methods known in the art. Mere mixing of the particles with a liquid hydrocarbon of about the same temperature will generally be inadequate to cause retention of a sufficient quantity of the fluid within the porous solid.

After saturation of the solid particles with the low density fluid, the particles are slurried in a liquid carrier, preferably an inorganic carrier liquid, e.g., water. The carrier liquid should not be miscible with the low density fluid material. The slurry may contain about 5 to about 70%, preferably about 20 to about 60% and more preferably about 30 to about 50% by weight, of comminuted solids. The treated comminuted solids are preferably unreactive with and insoluble in the carrier liquid. Due to economics and availability of the carrier liquid, water will generally be the preferred carrier liquid although other equivalents will be obvious to those skilled in the art.

The slurry may be transported in bulk, e.g., by tank car, tank truck or tank barge, but is preferably transported under pressure through a conduit such as a pipeline. Since the treated comminuted solids of the present invention will have a density more nearly approaching that of the carrier liquid than the solids alone, the slurry may be more readily transported through a pipeline under laminar or transitional flow conditions for appreciable periods of time without significant settling of the solid particles. Furthermore, due to the lower apparent density of the comminuted solids, the flowing slurry will exhibit a decreased pressure drop under all flow conditions. Where conditions permit, however, transportation under turbulent flow conditions for short periods of time insure homogeneity of the slurry.

Saturating the pores of the solid material prior to slurrying the solids in the carrier liquid also has the secondary beneficial effect of preventing the sorption of the carrier by the solid particles, thereby eliminating undesired increases in slurry concentration and wetting of the particles by the carrier liquid.

Upon reaching its destination, the slurry may be separated by methods known in the art. If, however, the solid material is coal, coke or similar solid fuels and the low density fluid is a liquid hydrocarbon, it is unnecessary to separate the low density fluid from the solid fuel as both constituents may be simultaneously utilized for heating purposes, etc.

EXAMPLE I

A 5 lb. sample of lignite coal from the Beulah Seam, State of North Dakota, USA, is pulverized so that 95% of the resulting particles pass through a 14-mesh Tyler Series screen. The particles are charred at a temperature of 1800° F. for 1 hr. The resulting coal char particles, having an average porosity of 45%, are placed in a container with an equal volume of n-hexane. The mixture is heated to boiling, boiled for about 5 min. and then allowed to cool. The excess n-hexane is decanted from the mixture. The saturated char particles are then slurried with water and transported in a 1 inch diameter pipeline at the critical velocity of the slurry. The pressure drop in the pipeline for the n-hexane saturated particles is 12% less than for water saturated particles at the same concentration. At the terminal end of the pipeline, the water is separated from the particles by centrifugation. The particles are then heated and a substantial portion of the entrapped n-hexane is recovered.

It is not intended that this example limit the invention. Rather, all equivalents obvious to those skilled in the art are intended to be incorporated within this invention as defined in the specification and appended claims.

What is claimed is:

1. In a process of transporting comminuted solids having a specific gravity greater than about 1.0 and a porosity greater than about 10% in a liquid carrier as a slurry, the improvement comprising substantially saturating the pores of the solids with a liquid hydrocarbon containing up to six carbon atoms and having a specific gravity less than about 1.0 and which is not miscible with the liquid carrier prior to slurrying the solids in the carrier.

2. The process of claim 1 wherein the solids are coal, partially volatilized coal, volatilized coal, calcined coal, retorted oil shale, coke, coal char, or mixtures thereof.

3. The process of claim 1 wherein the solids have a specific gravity greater than about 1.2.

4. The process of claim 1 wherein the porosity of the comminuted solids is greater than 20% and at least 75% of the pore space is saturated with the hydrocarbon.

5. The process of claim 4 wherein the liquid hydrocarbon has a specific gravity less than about 0.9.

6. The process of claim 1 wherein the liquid carrier is water.

7. The process of claim 1 wherein the slurry is transported through a pipeline.

8. The process of claim 1 wherein the slurry contains about 5 to about 70% by weight of the solids.

9. the process of claim 1 wherein the solids are comminuted to an average particle size of about 0.1 to about 2,000 microns.

10. The process of claim 1 wherein the slurry is transported in a pipeline system and the liquid hydrocarbon is not present at concentrations and conditions within the pipeline such that cavitation of pumping means within the pipeline system will occur to substantially adversely affect the pumpability of the slurry.

11. In a process of transporting solids having a specific gravity greater than about 1.0 and an average porosity greater than about 10% by comminuting the solids to an average particle size of about 0.1 to about 2,000 microns, slurrying the solids in a water carrier and then transporting the slurry through a pipeline, the improvement comprising saturating the pores of the solids with a liquid hydrocarbon containing up to six carbon atoms and being immiscible with water and having a specific gravity less than about 1.0 prior to slurrying the solids in the carrier.

12. The process of claim 11 wherein the average particle size is about 25 to about 1,000 microns.

13. The process of claim 11 wherein the average porosity of the comminuted solids is greater than 20% and at least 75% of the pores are saturated with the hydrocarbon.

14. The process of claim 11 wherein the hydrocarbon has a specific gravity less than about 0.9.

15. The process of claim 11 wherein the solids are coal, partially volatilized coal, volatilized coal, calcined coal, retorted oil shale, coke, coal char or mixtures thereof.

16. The process of claim 11 wherein the solids have a specific gravity greater than about 1.2.

17. The process of claim 11 wherein the slurry contains about 5 to about 70% by weight of the solids.

* * * * *